United States Patent
Bancroft et al.

[11] Patent Number: 5,317,514
[45] Date of Patent: May 31, 1994

[54] INTEGRITY MONITORING OF NAVIGATION SYSTEMS USING BAYE'S RULE

[75] Inventors: Stephen Bancroft, Olathe; Susan S. Chen, Lenexa, both of Kans.

[73] Assignee: AlliedSignal Inc., Morris Township, Morris County, N.J.

[21] Appl. No.: 891,496

[22] Filed: May 29, 1992

[51] Int. Cl.[5] .................................... B06G 7/78
[52] U.S. Cl. ....................... 364/449; 364/450; 342/357; 342/450
[58] Field of Search ............... 364/449, 450, 451, 554, 364/452; 342/450, 457, 352, 357, 358

[56] References Cited

U.S. PATENT DOCUMENTS

| | | | |
|---|---|---|---|
| 3,659,085 | 4/1972 | Potter et al. | 364/449 |
| 4,069,412 | 1/1978 | Foster et al. | 364/448 |
| 4,232,313 | 11/1980 | Fleishman | 364/452 |
| 4,918,610 | 4/1990 | Becker | 364/451 |
| 5,045,860 | 9/1991 | Hodson | 342/451 |
| 5,111,209 | 5/1992 | Toriyama | 342/357 |
| 5,148,179 | 9/1992 | Allison | 342/357 |
| 5,177,489 | 1/1993 | Hatch | 342/357 |

OTHER PUBLICATIONS

The Effect of Geometry on Integrity Monitoring Performance, A. Brown and M. Sturza; pp. 121-129; Institute of Navigation (ION) Annual Meeting; Jun. 1990.
Autonomous GPS Integrity Monitoring Using the Pseudorange Residual; B. Parkinson and P. Axelrad; pp. 255-274; Navigation, Journal of the ION, vol. 35, No. 2; Summer 1988, USA.

*Primary Examiner*—Thomas G. Black
*Assistant Examiner*—Jacques H. Louis-Jacques
*Attorney, Agent, or Firm*—Donald B. Paschburg; Howard G. Massung

[57] ABSTRACT

Navigation system errors, which result from a bias or error in a transmitter's data or timing, are detected and isolated. The transmitters may be ground based or they may be in a satellite. The least square error residual is calculated using the information received from the transmitter and the last estimate of the aircraft's position. Using Baye's Rule, the residual is used to calculate the a posteriori conditional probability of each transmitter being in error. The a posteriori conditional probabilities, and an estimate of each transmitter's error or bias are used to estimate the system loss associated with the elimination of a particular transmitter's information from the calculation of the aircraft's position. The faulty transmitter is identified by determining which transmitter's elimination will result in minimal system loss. In some instances, the system loss is minimized by eliminating no transmitters. Once the configuration that produces minimal loss is determined, the aircraft's position is calculated using the information from the transmitters that compose the minimal loss configuration.

4 Claims, 4 Drawing Sheets

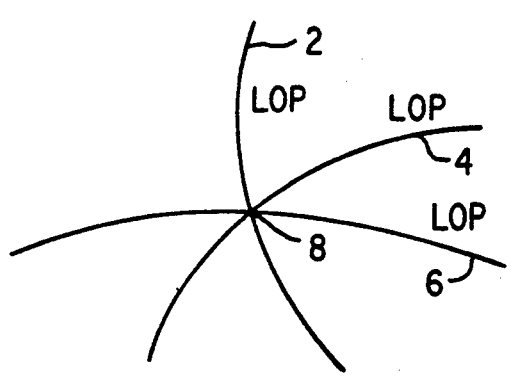

FIG. 1

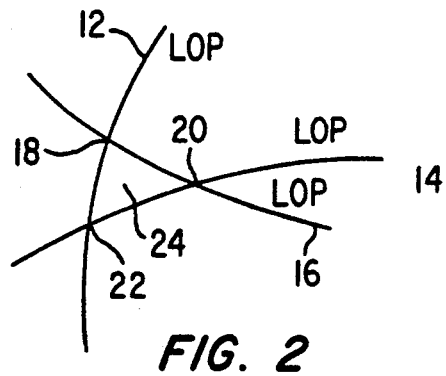

FIG. 2

| DECISION → | $\underline{\theta}_0$ | $\underline{\theta}_1$ | $\underline{\theta}_2$ | | | | | $\underline{\theta}_m$ |
|---|---|---|---|---|---|---|---|---|
| $h(\underline{\theta}_0|\underline{e}_t)$ $\underline{\theta}_0$ | $L_{00}$ | $L_{01}$ | $L_{02}$ | | | | | $L_{0m}$ |
| $h(\underline{\theta}_1|\underline{e}_t)$ $\underline{\theta}_1$ | $L_{10}$ | $L_{11}$ | | | | | | |
| $h(\underline{\theta}_2|\underline{e}_t)$ $\underline{\theta}_2$ | $L_{20}$ | | | | | | | |
| | | | | | | | | |
| | | | | | | | | |
| | | | | | | | | |
| | | | | | | | | |
| | | | | | | | | |
| $h(\underline{\theta}_m|\underline{e}_t)$ $\underline{\theta}_m$ | $L_{m0}$ | | | | | | | $L_{mm}$ |
| MARGINAL AVERAGES → | $M_0$ | $M_1$ | $M_2$ | | | | | $M_m$ |
| WORST CASE RISK → | $W_0$ | $W_1$ | $W_2$ | | | | | $W_m$ |

(top-left label: DECISION / TRUTH)

FIG. 4

INTEGRITY MONITORING OF NAVIGATION SYSTEMS USING BAYE'S RULE

BACKGROUND OF THE INVENTION

1. Field of the Invention

The present invention relates to fault detection and isolation in any system whose system state is observed with an overdetermined set of measurements. More particularly, the present invention relates to fault detection and isolation in navigation systems.

2. Description of the Related Art

Navigation systems, such as those used in aircraft, determine position through the use of ranging systems. Ranging systems ascertain an aircraft's position by simultaneously determining the aircraft's distance from several transmitters, where the location of each transmitter is known.

The ranging systems can be either passive or active. An active ranging system uses distance measuring equipment (DME) to determine a distance from a ground based transmitter. The DME transmits a signal to the ground station and then after a fixed delay, the ground station transmits a signal to the DME. By measuring the round trip time of the signal, the DME determines the aircraft's distance from the ground station.

An example of a passive ranging system is the global positioning system (GPS). In this system the aircraft GPS equipment passively receives transmissions from a global positioning satellite to determine the aircraft's distance from the satellite. The distance from the satellite is determined by the amount of time that it takes for the signal to travel from the satellite to the aircraft. The GPS system in the aircraft is not synchronized to the satellite, and therefore does not know precisely when the satellite transmitted its signal. As a result, the range measured by the aircraft's GPS equipment contains an offset that corresponds to the amount of time by which the satellite and aircraft GPS equipment are out of synchronization. The range measurements containing this offset are called pseudorange measurements. The offset as well as the position is determined by taking several pseudoranges and solving the resulting simultaneous algebraic equations in accordance with well known procedures.

Whether using an active or passive ranging system, the navigation system uses the range measurements to determine the aircraft's position. The range measurements are used to determine lines of position (LOP), where each LOP is a portion of a circle having the satellite or ground station at its center. In a two dimensional navigation system a LOP defines a line, and in a three dimensional navigation system a LOP defines a surface. In the case of an active system, the radius of the circle is equal to the aircraft's distance from the satellite or ground station. In a passive system the radius measurement includes the above described offset. FIG. 1 illustrates three LOPs. LOPs 2, 4 and 6 were determined by calculating the distance from the aircraft to three different transmitters. Point 8 corresponds to the intersection of the three LOPs and indicates the aircraft's position.

FIG. 2 illustrates three LOPs that do not intersect in a single point. The three LOPs do not intersect in the same point because one of the LOPs contains an error resulting from an incorrect determination of the aircraft's distance from the ground station or satellite transmitter. This error could result from an excessive delay in the retransmit from a ground based transmitter or it could result from a satellite transmitter being out of synchronization with other satellite transmitters. In reference to figure two, LOP 12, 14 or 16 could be incorrect. This results in three possible aircraft positions shown by intersecting points 18, 20 and 22. Since it is not known which LOP is incorrect, the aircraft's position is estimated to be somewhere within area 24 which is bounded by the three LOPs. The distances from the estimated position to the several LOPs are called error residuals. In the past, the integrity of this type of navigation system was monitored by measuring the size of the residuals. When the RMS (root means square) of the residuals became greater than a threshold, an integrity alarm was sent to a pilot. Unfortunately, there was no fault isolation to identify the LOP that was in error.

SUMMARY OF THE INVENTION

The present invention detects and isolates the bias in a transmitted signal that results in an incorrect LOP. Multiple biases in several signals can also be detected and isolated. The error introduced by the bias is corrected or the error producing transmitter is eliminated from the navigation system's receive schedule.

A navigation system receives signals from a plurality of transmitters and identifies an error producing transmitter. The navigation system comprises means for receiving transmitted signals from the plurality of transmitters, means for determining ranges from the transmitters, means for computing a least square residual error using the ranges, means for determining a conditional probability that a transmitter is the error producing transmitter using the least square residual error and Bayes Rule, and means for choosing a maximum conditional probability to identify the error producing transmitter.

BRIEF DESCRIPTION OF THE DRAWINGS

FIG. 1 illustrates three lines of position without an error;

FIG. 2 illustrates three lines of position with an error;

FIG. 4 is a chart illustrating a Bayesian risk matrix; and

DESCRIPTION OF THE PREFERRED EMBODIMENT

Figure 3:
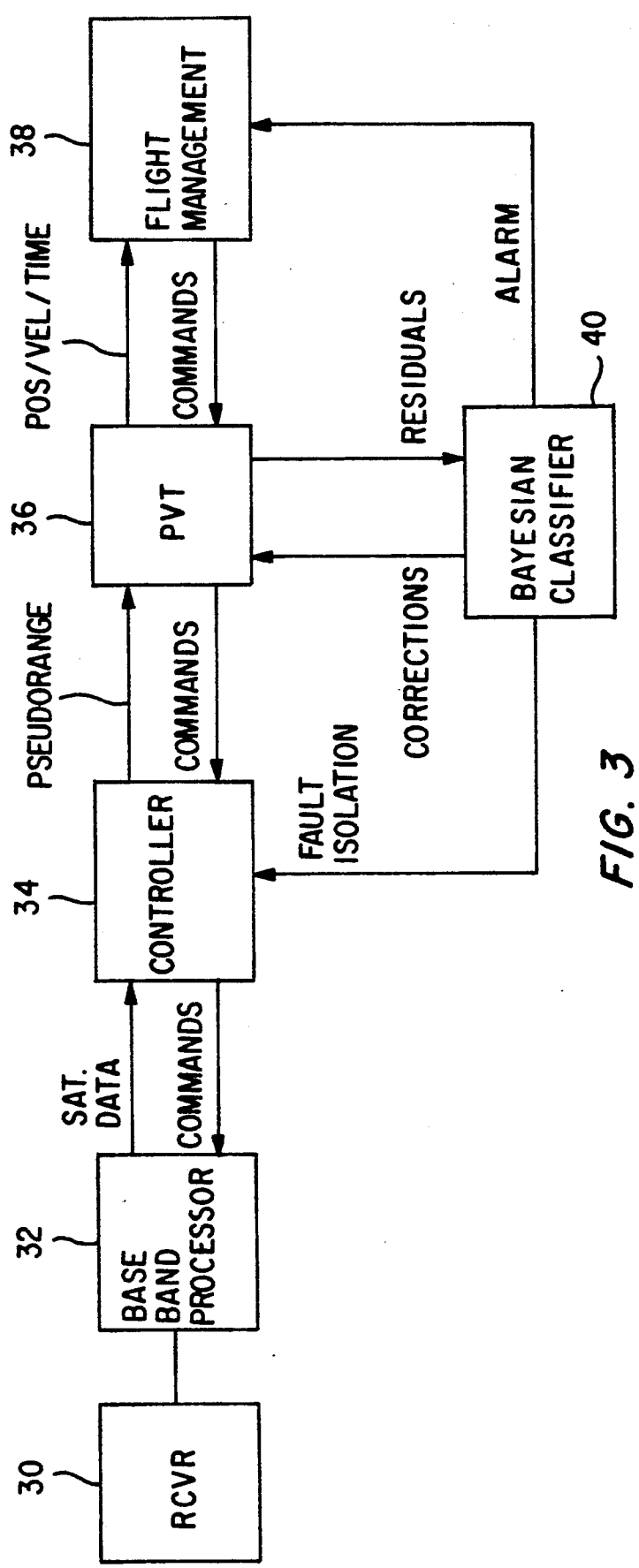
FIG. 3 is a block diagram of a GPS navigation system including the present invention.

FIG. 3 is a block diagram of a GPS system containing the present invention. The GPS system includes receiver 30, base band processor 32, controller 34, position/velocity/time (PVT) computer 36, flight manager 38 and Bayesian classifier 40. Receiver 30 includes the antenna and a down converter that converts the high frequency signals received by the antenna to a base band frequency. Base band processor 32 receives the base band signal from receiver 30. Base band processor 32 extracts the satellite data from the base band signal by performing an autocorrelation function between the received signal and a code that corresponds to the satellite being received. This code is changed to select the satellite that is being monitored. Base band processor 32 is given the schedule of satellites to monitor by controller 34. Controller 34 receives the satellite data from base band processor 32 and calculates a pseudorange which is passed to PVT computer 36. Controller 34 also receives fault isolation information from computer or Bayesian classifier 40. The controller uses this information to instruct base band processor 32 as to which satellites should be monitored. For example, if a particular satellite is found to be the source of an error, that satellite is removed from the list of satellites monitored by base band processor 32. Typically a plurality of satellites are monitored at one time, therefore a satellite can be removed from the monitoring schedule while still providing a sufficient number of monitored satellites for determining an aircraft's position.

PVT computer 36 receives the pseudoranges from controller 34, calculates the aircraft's position and velocity, and then provides that information to flight management unit 38. PVT computer 36 also provides flight management unit 38 with the reference time received from the satellite. In addition to calculating position and velocity, PVT computer 36 calculates the residuals which are provided to Bayesian classifier 40. Bayesian classifier 40 uses the residuals to detect faults or a bias in the satellite's data. Bayesian classifier 40 then calculates a least squares solution to correct for the bias and provides that information to PVT computer 36. If the detected bias becomes too great, Bayesian classifier 40 notifies controller 34 that a particular satellite is the source of the bias. Controller 34 then removes the faulty satellite from the monitoring schedule carried out by base band processor 32. Bayesian classifier 40 also provides an integrity alarm to flight management unit 38.

Flight management unit 38 provides the pilot interface to the navigation system. This interface provides the pilot with position, velocity and time data as well as information regarding the integrity of the navigation system. The pilot can also provide commands to the navigation system through flight management unit 38.

Bayesian classifier 40 uses Baye's Rule to provide early detection identification and compensation of a measurement bias in an overdetermined set of equations, that is when an excess number of transmitters is available to make range measurements. This technique is applicable to integrity monitoring of satellites in a GPS navigation system as well as to any system whose system state is observed with an overdetermined set of measurements.

The problem of determining an aircraft's two dimensional position using an overdetermined set of measurements can be expressed with the following equations.

$$D_1 = D_1(x,y) = \sqrt{(x - a_1)^2 + (y - b_1)^2} \tag{0.1}$$

$$D_2 = D_2(x,y) = \sqrt{(x - a_2)^2 + (y - b_2)^2}$$

$$D_3 = D_3(x,y) = \sqrt{(x - a_3)^2 + (y - b_3)^2}$$

where $D_1$, $D_2$ and $D_3$ are the observed distances to a transmitter, and $a_1$ and $b_1$ are the coordinates of the transmitter associated with $D_1$, $a_2$ and $b_2$ are the coordinates of the transmitter associated with $D_2$ and $a_3$ and $b_3$ are the coordinates of the transmitter associated with $D_3$.

To linearize the problem, the above equations can be differentiated to produce the following.

$$dD_1 = \frac{\partial D_1}{\partial x} dx + \frac{\partial D_1}{\partial y} dy \tag{0.2}$$

$$dD_2 = \frac{\partial D_2}{\partial x} dx + \frac{\partial D_2}{\partial y} dy$$

$$dD_3 = \frac{\partial D_3}{\partial x} dx + \frac{\partial D_3}{\partial y} dy$$

where the differentials $dD_1$, $dD_2$ and $dD_3$ are the difference between an estimated range from the corresponding transmitter and the observed range, and where the partial derivatives are constants that result from evaluating the partial derivative at the x and y coordinate corresponding to the estimated range. The dx and dy in each equation corresponds to the difference between the estimated x and y coordinates of the aircraft, and the coordinates of the aircraft that correspond to the measured range. The preceding set of equations can be rewritten as $$a_1 x + b_1 y = d_1 \tag{0.3}$$

$$a_2 x + b_2 y = d_2$$

$$a_3 x + b_3 y = d_3$$

using matrix notation this can be rewritten as $$\begin{pmatrix} a_1 & b_1 \\ a_2 & b_2 \\ a_3 & b_3 \end{pmatrix} \begin{pmatrix} x \\ y \end{pmatrix} = \begin{pmatrix} d_1 \\ d_2 \\ d_3 \end{pmatrix} \tag{0.4}$$

this can be rewritten to define the linear least square problem as shown by $$Ax = d \tag{1.1}$$

where x and d represent vectors, and where A represents a matrix that performs a linear transformation.

More generally, A is a m by n matrix that maps $R^n$ into $R^m$ where m is greater than n. M is the number of rows in matrix A and corresponds to the number of satellites or transmitters being monitored, and n is the number of columns in matrix A and corresponds to the number of variables being determined by monitoring the transmitters. In the case of a GPS navigation system, there are typically four variables being determined. These variables correspond to the aircraft's position in terms of the x, y and z coordinates and the user's clock offset b. The space $R^m$ is known as the requirements space and the $R^n$ is known as the solution space.

If we let $\{a_j; 1 \leq j \leq n\}$ denote the columns of A in $R^n$, so that $$A = (a_1 \ a_2 \ldots a_n), \tag{1.2}$$

then (1.1) may be cast as a linear relationship in the requirements space:

$$\Sigma a_j x_j = d. \tag{1.3}$$

We can also introduce the nxm measurement matrix H, defined by $$H = A^T. \tag{1.4}$$

The columns $\{h_i: 1 \leq i \leq m\}$ of H are the normal vectors in $R^n$ for the various hyperplanes defined in $R^n$ by the individual component equations in (1.1):

$$h_i^T x = d_i, \quad 1 \leq i \leq m. \tag{1.5}_i$$

Thus $h_i^T$ is the $i^{th}$ row of A. We can assume without loss of generality that A is row-normalized, i.e. there is a constant $c_o$ such that $$|h_i|^2 = h_i^T h_i = c_o^2, \quad 1 \leq i \leq m. \tag{1.6}_i$$

Each equation in $(1.5)_i$ is known as a measurement on the state x of our system.

For simplicity, we assume that the measurements are corrupted by zero mean Gaussian noise and possibly by the presence of a single-axis bias. The treatment is amenable to more general noise environments and multiple biases. In particular, the analysis remains valid for the "3 layer" model of Gaussian noise used to represent the noise environment associated with the Selective Availability characteristic of the GPS system, i.e. the total error is the sum of a random constant (very slowly changing random variable), the output of a Gauss Markov process with a two minute correlation time and white Gaussian noise (correlation time less than 1 second).

More precisely, if $x_o$ is the nominal state of our system in $R^n$ and $d_o = A x_o$ is the set of associated nominal measurements in $R^m$, we assume that the actual measurements have the form $$d = d_o + b + v. \tag{1.7}$$

Here $v$ represents the Gaussian noise with mean $\mu(v)$ and covariance $C(v)$ given by $$\mu(v) = 0 \tag{1.8}$$

$$C(v) = \sigma_v^2 I_m, \tag{}$$

where $I_m$ is the mxm identity for $R^m$. Also for simplicity in this presentation the bias b is assumed to have the single-axis form $$b = f_i b \tag{1.9}$$

for some fixed i, $1 \leq i \leq m$, where $F_m = (f_1 f_2 \ldots f_m)$ is the standard basis for $R^m$, i.e. $f_i$ is the $i^{th}$ column of the identity matrix $I_m$.

2. Least Squares Tools

We now introduce some important matrices associated with A. First, we define the nxn information matrix D:

$$D = A^T A. \tag{2.1}$$

Next, we introduce the nxm pseudo-inverse matrix $A^\#$:

$$A^\# = CH, \quad C = D^{-1} \text{ and } H = A^T. \tag{2.2}$$

Let $S = \text{Im}(A)$ be the subspace denoting the range of A in $R^m$, and $T = S^\perp$ be the orthogonal complement of S in $R^m$. Then T is the kernel or nullspace of $A^T$ and $R^m$ may be written as the direct sum of S and T:

$$R^m = S \oplus T. \tag{2.3}$$

We now introduce the orthogonal projection P onto the range of A in $R^m$, defined by $$P = A A^\#. \tag{2.4}$$

P satisfies $$S = \text{Im}(P) \tag{2.5}$$

$$T = \text{Ker}(P). \tag{}$$

The mxm complementary projection Q, defined by $$Q = I - P, \tag{2.6}$$

satisfies $$S = \text{Ker}(Q) \tag{2.7}$$

$$T = \text{Im}(Q). \tag{}$$

Note: The orthogonal projections P and Q are symmetric, positive semidefinite idempotent matrices, i.e. $P = P^T$, $y^T P y \geq 0$ and $PP = P$, with similar statements for Q.

The least squares solution of (1.1) is returned by $$x^\# = A^\# d. \tag{2.8}$$

The error $dx^\# = x^\# - x_o$ in the least squares solution is itself the least squares solution of the problem $$A x = e, \tag{2.9}$$

where $e = d - d_o$ is the error in the measurement vector d. The mean and covariance of $dx^\#$ are given by $$\mu(dx^\#) = A^\# b \tag{2.10}$$

$$C(dx^\#) = \sigma_v^2 C. \tag{}$$

We shall refer to $C = D^{-1}$ as the $\sigma_v^2$-normalized covariance matrix for our system. The GDOP (geometric dilution of precision) for our system is given by $$GDOP_o = \sqrt{tr(C)}. \tag{2.11}$$

When no bias is present, the GDOP can be used to get the rms value of the system error:

$$rms(dx^\#) = \sqrt{E(dx^{\#T} dx^\#)} = \sigma_v GDOP_o. \tag{2.12}$$

We also have the following result that may be of interest, if we wish to compute the system GDOP without completing the inverse computation implied in $C = D^{-1}$:

The system $GDPO_o$ can be computed from the determinant $\Delta$ of the information matrix D, according to the relation $$GDPO_o = c_o \sqrt{(m/\Delta)}. \tag{2.13}$$

NOTE: In practice, the real importance of (2.13) is that it serves as a stepping stone in establishing a formula for estimating the GDOP of a reduced system $A_r x = d_r$, obtained by dropping measurements from the original system $Ax=d$. (See $(3.2)_r$ below.)

3. GDOP and Fault Detection

If a bias $b_i$ appears on axis i, we shall say that there is a fault associated with that measurement. The measurement redundancy in the information matrix can be used to detect the presence of such faults. In particular we can detect a single-axis bias b provided $m > n$. If $m > n+1$, then the redundancy can be used to isolate the particular axis on which the bias occurs.

To describe some of the important ideas in this program it will be helpful to let $r$ $\{1, 2, \ldots m\}$ denote a subset of the measurement indices. The size of r will be denoted by $|r|$. If we drop the equations indexed by r from the system $Ax=d$, we get the r-reduced system $$A_r x = d_r. \qquad (3.1)_r$$

We shall see that to detect a bias in our original system along the axis $f_i$ in $R^m$, it is necessary that the r-reduced system $(3.1)_r$ have a good $GDOP_r$, where $r = \{i\}$. To be assured of detecting an arbitrary single-axis bias b, we must have a good $GDOP_r$ for every r-reduced system, where $|r| = 1$.

To isolate the axis $f_i$ for the bias b, it must further be true that every r-reduced system $(3.1)_r$ have a good $GDOP_r$ where $r = \{i,j\}$ is an index subset of size 2 containing the bias index i. Thus to isolate an arbitrary single-axis bias b, we must have a good $GDOP_r$ for every r-reduced system, where $|r| = 2$.

In connection with these observations it will be convenient to have an efficient means of computing the numbers $GDOP_r$. To this end we state the following Let $Q_{rr}$ be the square $|r| \times |r|$-sized matrix gotten by extracting from Q the elements whose rows and columns are indexed by r. Let $\Delta_{rr}$ be the determinant of $Q_{rr}$. Then $$GDOP_r = GDOP_o \sqrt{[(1 - |r|/m)/\Delta_{rr}]}. \qquad (3.2)$$

If $r = \{i\}$ is an index subset of size 1, then $\Delta_{rr} = Q_{ii}$ where $Q_{ii}$ is the $i^{th}$ element along the diagonal of Q. Hence $(3.2)_r$ reduces to $$GDOP_r = GDOP_o \sqrt{[(1 - 1/m)/Q_{ii}]}, \quad r = \{i\}. \qquad (3.3)_i$$

In light of $(3.3)_i$, we might be tempted to search for systems $Ax=d$ where the numbers $Q_{ii}$ are as large as possible. The following result shows that the $Q_{ii}$ are bounded between 0 and 1 and that whenever there is some $Q_{ii}$ above a well defined average value $(Q_{ii})_{avg}$, there must also be a $Q_{ii}$ below that average:

Theorem

The following bounds hold on the numbers $\Delta_{rr}$:

i) $0 \leq \Delta_{rr} \leq 1$ \qquad $(3.4)_r$ ii) $(\Delta_{rr})_{avg} = C(m - n, r)/C(m, r)$.

Here the binomial coefficient $C(n,r)$ counts the number of possible combinations of n objects taken r at a time. In particular, this means that the elements $Q_{ii}$ along the diagonal of Q satisfy i) $0 \leq Q_{ii} \leq 1$ \qquad $(3.5)_i$ ii) $(Q_{ii})_{avg} = 1 - n/m$.

NOTE: The most desirable set of circumstances is when all the $Q_{ii}$ "crowd" up near their average value $Q_{ii} = 1 - n/m$. This will tend to happen when the "tips" of the normals $h_i$ for the various measurement hyperplanes are symmetrically distributed on the sphere of radius $c_o$. Notice that as the number of measurements m becomes large with respect to the number of elements n in the state of the system, $(\Delta_{rr})_{avg} \rightarrow 1$.

As a further result along these same lines, we also have the following:

Let $A_r^\#$ be the columns of $A^\#$ indexed by r. Then the r-reduced covariance matrix $C_r$ is given by $$C_r = C + A_r^\# Q_{rr}^{-1} A_r^{\#T}. \qquad (3.6)_r$$

NOTE: For a GPS application, $x = (x\ y\ z\ b)^T$, where the clock offset b is not to be confused with a measurement bias. The result (3.6) is especially helpful if we are interested in computing just the HDOP (horizontal dilution of precision) for the reduced system—see the topic System Availability in Section 4 below. In fact, to obtain the system HDOP we need only compute the first two diagonal elements in $C_r$. If $|r| = 1$, then $Q_{rr}^{-1}$ is just the reciprocal of the scalar element $Q_{ii}$ along the diagonal of Q. Also the matrix product $A_r^\# A_r^{\#T}$ reduces in this case to the dyadic product of the $i^{th}$ column $a_i^\#$ of $A^\#$ with itself.

4. Bayes' Rule, Bias Detection, System Availability and Fault Isolation Bayes' Rule:

For single axis bias detection and isolation, we will suppose that the probability of a fault on the $i^{th}$ axis is given by $\alpha$, and that $\alpha$ is so small that there is a negligible possibility of simultaneous faults on two or more axes. We will let $\theta_i$ denote the hypothesis that there is a fault on the $i^{th}$ axis, $1 \leq i \leq m$, and $\theta_o$ denote the null hypothesis, i.e. there is no fault on any axis. Under these assumptions, it should then be clear that exactly one of these $m + 1$ hypotheses is true at all times. We may then express the a priori probability function for the hypotheses in the form $$h(\theta_i) = \begin{cases} 1 - m\alpha & i = 0 \\ \alpha & 1 \leq i \leq m \end{cases} \qquad (4.1)_i$$

We introduce the $\sigma_\nu$-normalized least squares error residual $e_t$, defined by $$e_t = \sigma_\nu^{-1} Qd. \qquad (4.2)$$

Then the $\sigma_\nu$-normalized least squares estimate $b_i^\#$ of a bias $b_i$ on the $i^{th}$ axis is given by the $i^{th}$ component of the vector $$b^\# = \text{diag}(Q_{ii}^{-1}) e_t. \qquad (4.3)$$

Here $\text{diag}(Q_{ii})$ is the matrix whose diagonal elements agree with those of Q and whose off-diagonal elements are zero.

We form up the associated normalized least squares noise residuals $r_i^\#$ defined by $$r_i^{\#2} = e_t^T e_t - Q_{ii} b_i^{\#2}, \quad 1 \le i \le m, \quad (4.4)_i$$

and $$r_o^{\#2} = e_t^T e_t. \quad (4.4)_o$$

The conditional probability $f(e_t|\theta_i)$ of observing the error $e_t = \sigma_v^{-1} Q d$, given the hypothesis $\theta_i$, is provided by the expression $$f(e_t|\theta_i) = c^* \exp(-r_i^{\#2}/2), \quad 0 \le i \le m, \quad (4.5)_i$$

where * represents multiplication.

Here the normalizing constant c is given by $c = [\frac{1}{2}\pi]^{(m-n)/2}$. We can then use Bayes' Rule to get the a posteriori conditional probabilities $$h(\theta_i|e_t) = f(e_t|\theta_i) h(\theta_i)/g(e_t), \quad 0 \le i \le m, \quad (4.6)_i$$

where $g(e_t)$ is the marginal distribution for $e_t$ defined by $$g(e_t) = \sum_i f(e_t|\theta_i) h(\theta_i). \quad (4.7)$$

We remark that this application of Bayes' Rule may look a little unconventional in that we are mixing random vaiables with distributions characterized by continuous density functions with random variables with distributions characterized by discrete probability functions. Owing to the form of $(4.6)_i$ and (4.7), the normalizing constant c used in $(4.5)_i$ will cancel out, and hence need never be evaluated. Our criterion for bias detection and isolation will use the a posteriori probabilities indicated in $(4.6)_i$.

Bias Detection:

We will say that a bias has been detected with $3\sigma_v$ certainty if $$h(\theta_o|e_t) < 0.01. \quad (4.8)$$

From $(4.5)_i$ and $(4.4)_o$, we see that $h(\theta_o|e_t)$ will decrease as the magnitude of $r_o^{\#2}$ increases. This indicates that the Probability of False Alarm associated with (4.8) can be related to a condition of the form $r_o^{\#2} > \lambda_o^2$, where $r_o^{\#2}$ is the test statistic introduced in $(4.4)_o$ and $\lambda_o$ is some False Alarm threshold. (The threshold $\lambda_o$ will be related to the parameter $\alpha$ in (4.10) and (4.11) below.) Since the system noise is supposed Gaussian and $r_o^{\#2}$ is the projection of the noise into a space of dimension m-n, it should be obvious that the test statistic $r_o^{\#2}$ has a $\chi^2$ distribution with $\nu = m-n$ degrees of freedom. For a typical GPS application $\nu$ may lie between 1 and 4, although in some cases the upperbound 4 may be increased. A rough order of magnitude for the Probability of False Alarm in all these typical cases is afforded by taking $\nu = 2$. In this case, the $\chi^2$ distribution can be calculated in closed form:

$$\text{Prob}_{FA} = \exp(-\tfrac{1}{2}\lambda_o^2). \quad (4.9)$$

More specifically, by substituting $(4.6)_i$ together with the supporting definitions found in $(4.1)_i$-$(4.5)_i$ into (4.8) and making a few more or less obvious approximations to recognize "worst case" estimates, $\lambda_o$ is related to the parameter $\alpha$ used in the definition of the a priori and a posteriori probabilities according to the relation $$\lambda_o = \sqrt{(2.01 n[(1-m\alpha)/(0.01 m\alpha)])} \quad (4.10)$$

If we accept the approximation (4.9), then we can combine (4.9) and (4.10) to obtain a relation between $\alpha$ and the probability of False Alarm:

$$\alpha = (x_o/m)/(1+x_o); \quad x_o = \text{Prob}_{FA}/0.01. \quad (4.11)$$

NOTE: Equation (4.11) is useful if we want to set a level for $\text{Prob}_{FA}$ and then find the parameter $\alpha$ that will cause the test criterion in (4.8) to realize that leve. Usually $\text{Prob}_{FA} <$ 0.01, in which case (4.11) reduces to $\alpha = \text{Prob}_{FA}/(0.01\ m)$.

The minimum bias $b_i$ along the $i^{th}$ axis which can be detected with $3\sigma_v$ certainty is given by $$b_i^{det} = (\lambda_o + 3)/\sqrt{Q_{ii}} \quad (4.12)_i$$

Hence the minimum bias $b_{min}^{det}$ that can always be detected with $3\sigma_v$ certainty is given by $$b_{min}^{det} = \max b_i^{det} \quad 1 \le i \le m. \quad (4.13)$$

System Availability:

Let $e_H$ denote the $\sigma_v$-normalized maximum horizontal error allowed before a bias detection is made. Then, making use of (2.10), with $b = f_i b$, we see that the maximum allowable bias $b_i^{alw}$ along the $i^{th}$ axis is given by $$b_i^{alw} = e_H/\sqrt{a_i^{\#T} a_i^{\#}}, \quad (4.14)_i$$

where $a_i^{\#}$ is the $i^{th}$ column of the pseudoinverse $A^{\#}$, and the inner product $a_i^{\#T} a_i^{\#}$ is a "partial" inner product, summing only the first two components of $a_i^{\#}$.

It should be obvious that the availability of integrity monitoring requires $$b_i^{det} \le b_i^{alw}, \quad 1 \le i \le m, \quad (4.15)_i$$

or using $(4.12)_i$ and $(4.14)_i$ in $(4.15)_i$, and rearranging, we see that we must have $$e_H/(\lambda_o + 3) \ge \sqrt{(a_i^{\#T} a_i^{\#}/Q_{ii})}, \quad 1 \le i \le m. \quad (4.16)_i$$

Consulting $(3.6)_r$, we see that the expression on the right here denotes the change $dHDOP_i$ in the system HDOP when the $i^{th}$ measurement is dropped:

$$dHDOP_i = \sqrt{(a_i^{\#T} a_i^{\#}/Q_{ii})}, \quad 1 \le i \le m. \quad (4.17)$$

Thus we characterize the system availability in terms of the maximum change in HDOP:

$$\max dHDOP_i \le e_H/(\lambda_o + 3) \quad 1 \le i \le m. \quad (4.18)$$

When navigating a GPS approach, the horizontal error should remain under 0.3 nm or 556 m in the presence of a selective availability noise level whose overall $\sigma_v$ is 35 m. This corresponds to taking the $\sigma_v$-normalized $e_H = 16$. A recommended probability of False Alarm is Prob$_{FA}$=0.00005. Using (4.9), we see that $\lambda_o$=4.5. Substituting in (4.14), we see that $$\max dHDOP_i \leq 2.1, \text{ (GPS approach) } 1\leq i\leq m. \quad (4.19)$$

If we wish to extend the availability of the system monitoring at the expense of a greater Prob$_{FA}$, we may choose $\lambda_o$ so small that $b_i^{det}$ in (4.12)$_i$ satisfies (4.15)$_i$ for every i, $1\leq i\leq m$. We can then find the corresponding Prob$_{FA}$ and dHDOP$_{max}$ from (4.13) and (4.18) respectively.

Fault Isolation:

Next we address the issue of fault isolation. We will say there is a bias on the $i^{th}$ axis, with $3\sigma_\nu$ certainty, if $$h(\theta_i|e_t)>0.99, 1\leq i\leq m. \quad (4.20)_i$$

The minimum $\sigma_\nu$-normalized bias $b_i^{iso}$ along the $i^{th}$ axis that allows identification of a fault along the $i^{th}$ axis with $3\sigma_\nu$ certainty is given by $$b_i^{iso} = 6\sqrt{(Q_{ii}/\min \Delta_{ij})} \quad (4.21)$$

$$1 \leq j \leq m$$

Here $\Delta_{ij}=\Delta_{rr}$ with r={i,j}. The number 6 arises naturally by requiring that the projections of $3\sigma_\nu$ spheres centered on axis $f_i$ and $f_j$ not overlap in the space T=Im(Q). To find the minimum bias $b_{min}^{iso}$ that can be isolated along any axis with $3\sigma_\nu$ certainty, take the maximum of all the expressions given in (4.2)$_i$:

$$b_{min}^{iso}=\max b_i^{iso} \; 1\leq i\leq m. \quad (4.22)$$

The user should abort attempts at Fault Isolation if any of the estimated biases $b_i^{\#}$ exceeds the corresponding maximum allowable level $b_i^{alw}$, $1\leq i\leq m$, introduced in (4.14)$_i$ for more than a few seconds.

5. Early Detection

One pitfall with the results stated so far is that there may actually be quite a large bias present in the system before we are ready to recognize with any certainty that such a bias is present. An undetected bias $b_i$ on the $i^{th}$ axis will introduce a non-zero mean least squares error, as indicated in (2.10), given by $$\mu(dx^\#)=a_i^\# b_i. \quad (5.1)$$

Thus before we are ready to announce the detection of $b_i$, the presence of the bias may already have introduced an unacceptable level of error into the conventional least squares solution $x^\#$. The conventional least squares solution contains no recognition of the system modeling implied by the single-axis bias assumption. We would therefore like to provide a least squares solution $x^{\#\#}$ that does recognize this assumption. In this section we describe how to go about this.

While we don't actually know $b_i$, we do have the estimate $b_i^\#$ provided by the $i^{th}$ component of (4.3). Accordingly, we introduce the loss vectors {L$_1$: $0\leq i\leq m$}, defined by $$L_i = \begin{cases} 0 & i=0 \\ a_i^\# b_i^\# & 1\leq i\leq m \end{cases} \quad (5.2)_i$$

We then introduce the (m+1)×(m+1) Bayesian Risk Matrix defined by $$L_{ij}=|L_i-L_j|, 0\leq i,j\leq m. \quad (5.3)_{ij}$$

NOTE: $L_{ij}^2=(L_i-L_j)\cdot(L_i-L_j)$. Here · represents the inner product of two vectors. If we are interested in the horizontal errors only, we can just let the summation index range over the x,y coordinates of the state vector $x=(x\;y\;z\;b)^T$ when forming this inner product.

NOTE: If we select hypothesis $\theta_j$, and compensate the least squares solution $x^\#$ returned by (2.8) with the estimated error $dx^{\#\#}=a_j^\# b_j^\#$, as suggested by (5.1), when the hypothesis $\theta_i$ is actually true, then (under good SNR conditions) $L_{ij}$ will measure the amount of error $L(\theta_j|\theta_i)$ incurred by this mistake.

We now introduce the marginal risk $M(\theta_j|e_t)$ =E[L$^2$(·,$\theta_j$)$|e_t$] (In this case · references a suppressed argument.) defined by $$M(\theta_j|e_t) = \sum_i L_{ij}^2 h(\theta_i|e_t). \quad (5.4)_j$$

It should be clear from this expression that $M(\theta_j|e_t)$ is just the expected loss for our system when we have observed the statistic $e_t$ and made the decision to use hypothesis $\theta_j$. Thus $M(\theta_j|e_t)$ is just a "weighted" average of all the various possible losses $L_{ij}^2$ which could occur when a decision is made for the $j^{th}$ hypothesis $\theta_j$. The weights $w_i$, $0\leq i\leq m$, are our "best" current judgements $h(\theta_i|e_t)$ of the probabilities for the various hypotheses $\{\theta_i: 0\leq i\leq m\}$.

FIG. 4 is a diagram of the various quantities involved in defining $M(\theta_j|e_t)$. We see then that to minimize the Bayes' Risk associated with the loss function $L_{ij}$ we must use the decision rule $$\theta_j=D(e_t), \quad (5.5)$$

where $\theta_j$ chooses the hypothesis that provides the minimal marginal expected loss $M(\theta_j|e_t)$.

NOTE: Once we have chosen hypothesis $\theta_j$, it may also be of interest to record the worst case risk $W(\theta_j|e_t)$ associated with that choice:

$$W(\theta_j|e_t)=\max L_{ij}. \quad (5.6)$$

In fact, if we were confirmed pessimists, we might use the numbers $W(\theta_j|e_t)$ in place of $M(\theta_j|e_t)$ to make our decision $\theta_j$, thereby minimizing our maximum losses. In the theory of games, this policy is sometimes described as characterizing "nature" as a malevolent opponent. Where we have the a priori and a posteriori probabilities for each hypothesis $\theta_i$, such a decision policy does not really make sense.

NOTE: If we were to use the loss function defined by $$L_{ij}=1-\delta_{ij}, \quad (5.7)$$

where $\delta_{ij}$ is the kronecker delta function, we would obtain the Decision Rule that leads to selecting the hypothesis with the largest conditional probability $h(\theta_i|e_t)$.

To effect the compensation for the estimated error $dx^{\#\#}=a_j^\# b_j^\#$, we can simply modify the $j^{th}$ component of the data vector d by subtracting out the least square estimate of the bias $b_j^\#$ along the $j^{th}$ axis:

$$d\# = d - f_j b_j\# \tag{5.8}$$

We then use $$x\#\# = A\# d\# \tag{5.9}$$

in place of (2.8) as our least squares solution of $Ax=d$.

NOTE: We point out that if $m=n+1$, fault isolation is not possible. The decision algorithm (5.5) automatically recognizes this and will always return the null hypothesis. It will not opt for assigning a bias $b_j\#$ to the $j^{th}$ axis until $m > n+1$. However, when $m > n+1$ the excess redundancy will allow our decision algorithm to select a bias axis $f_j$ together with an estimated bias $b_j\#$ before $h(\theta_j|e_t)$ is near 1, provided the expected loss $M(\theta_j|e_t)$ is smaller than $M(\theta_o|e_t)$ This scheme works very well when the SNR is good, so that the estimated bias $b_j\#$ is close to the true axial bias $b_j$. This is in general the case when the $GDOP_r$ is quite good for every $r=\{i\}$, $1 \leq i \leq m$, or when $Q_{ii}$ is close to $1-n/m$ for every $i$, $1 \leq i \leq m$. However, if some $Q_{ii}$ is close to 0, so that the corresponding reduced system $A_r x = d_r$ has poor $GDOP_r$, then noise effects on the bias estimate $b_i$ (see the $i^{th}$ component of (4.3)) can become quite exaggerated. This means that the compensated data vector $d\#$ given in (5.8) may not be too reliable. Furthermore the loss numbers $L_{ij}$ will tend to be quite noisy. If these noise effects happen to reduce the value of $L_{ij}$, we may come up with an overly optimistic picture of the expected loss $M(\theta_j|e_t)$ and even of the worst case loss $W(\theta_j|e_t)$. To prevent the Bayes' Risk picture from looking too rosy, we will add to $L_{ij}$ a $3\sigma_v$ estimate of the standard deviation of $L_{ij}$, so that $L_{ij}$ will quite generally be reported at least as large as the real expectation of $L_{ij}$.

For $1 \leq i,j \leq m$, the variance $\delta L_{ij}^2$ of $L_{ij}$ is given by $$\delta L_{ij}^2 = \sigma_{84}^2 (A_{ii} Q_{jj} - 2B_{ij} Q_{ij} + C_{jj} Q_{ii})/(Q_{ii} Q_{jj}), \tag{5.10}_{ij}$$

where $$A_{ii} = a_i\# T a_i\#, \; B_{ij} = a_i\# T a_j\#, \; C_{jj} = a_j\# T a_j\#. \tag{5.11}_{ij}$$

We will take $\delta L_{oo}^2 = 0$. Also, we use $\delta L_{oj}^2 = \sigma_v^2 C_{jj}/Q_{jj}$, $1 \leq j \leq m$, and $\delta L_{io}^2 = \sigma_v^2 A_{ii}/Q_{ii}$, $1 \leq i \leq m$. We observe that the variances indicated in $(5.10)_{ij}$ vanish along the diagonal, when $i=j$, owing to the complete correlation of $b_i\#$ with $b_j\#$. Heuristic arguments suggest using $\delta L_{ii}^2 = \sigma_v^2 A_{ii}/Q_{ii}$, $1 \leq i \leq m$.

We then add 3 times the square root of these variances to the elements in $L_{ij}$ to obtain a more realistic picture of potential losses in our bias estimation scheme.

To round out the picture of the total loss in the system due to noise effects on all components of the data vector $d$, we can add to every $L_{ij}$ $3\sigma_v$ times the general $GDOP_o$ given in (2.11).

Figure 5A:
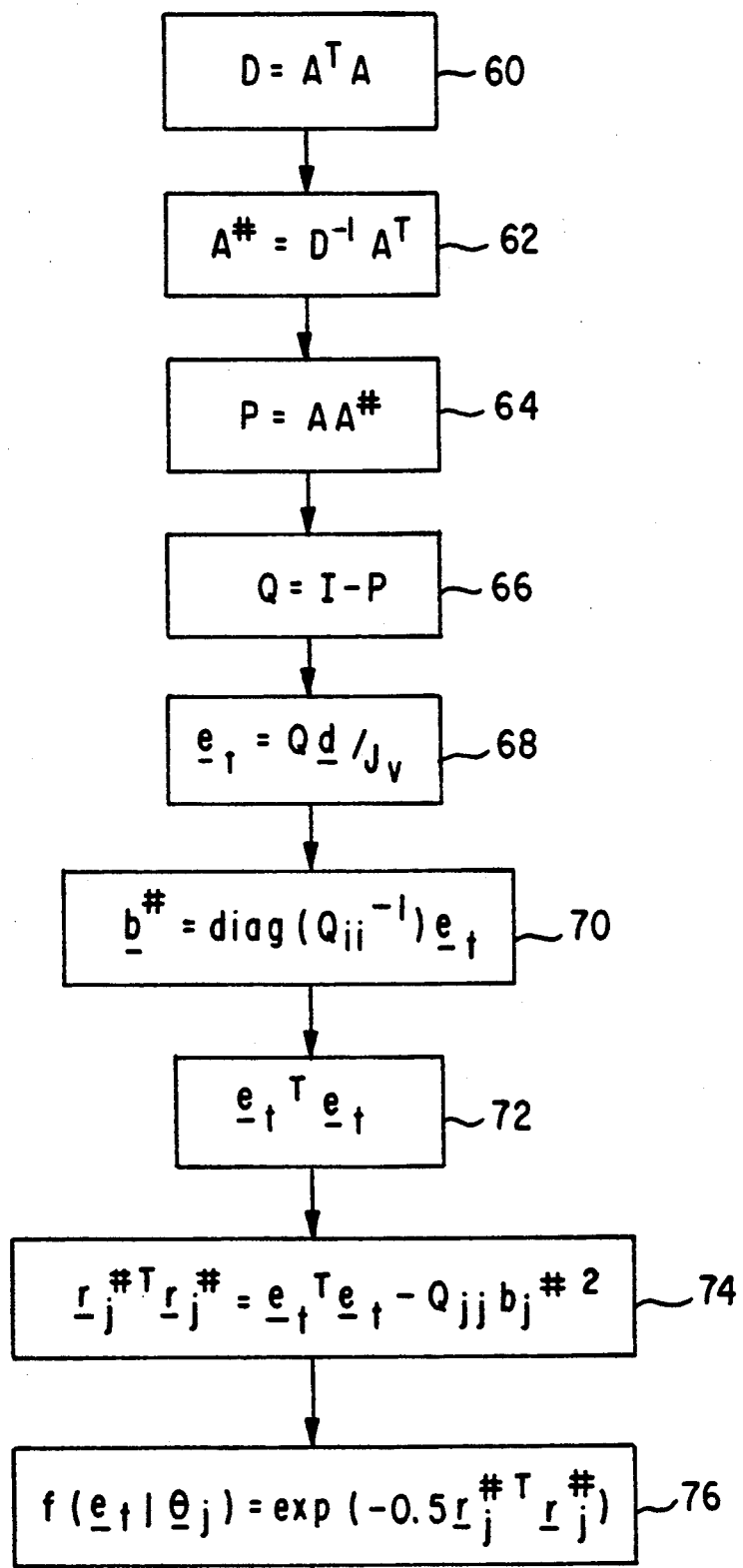
FIGS. 5A and 5B are flow charts illustrating the procedure for selecting a hypothesis that minimizes risk.
Figure 5B:
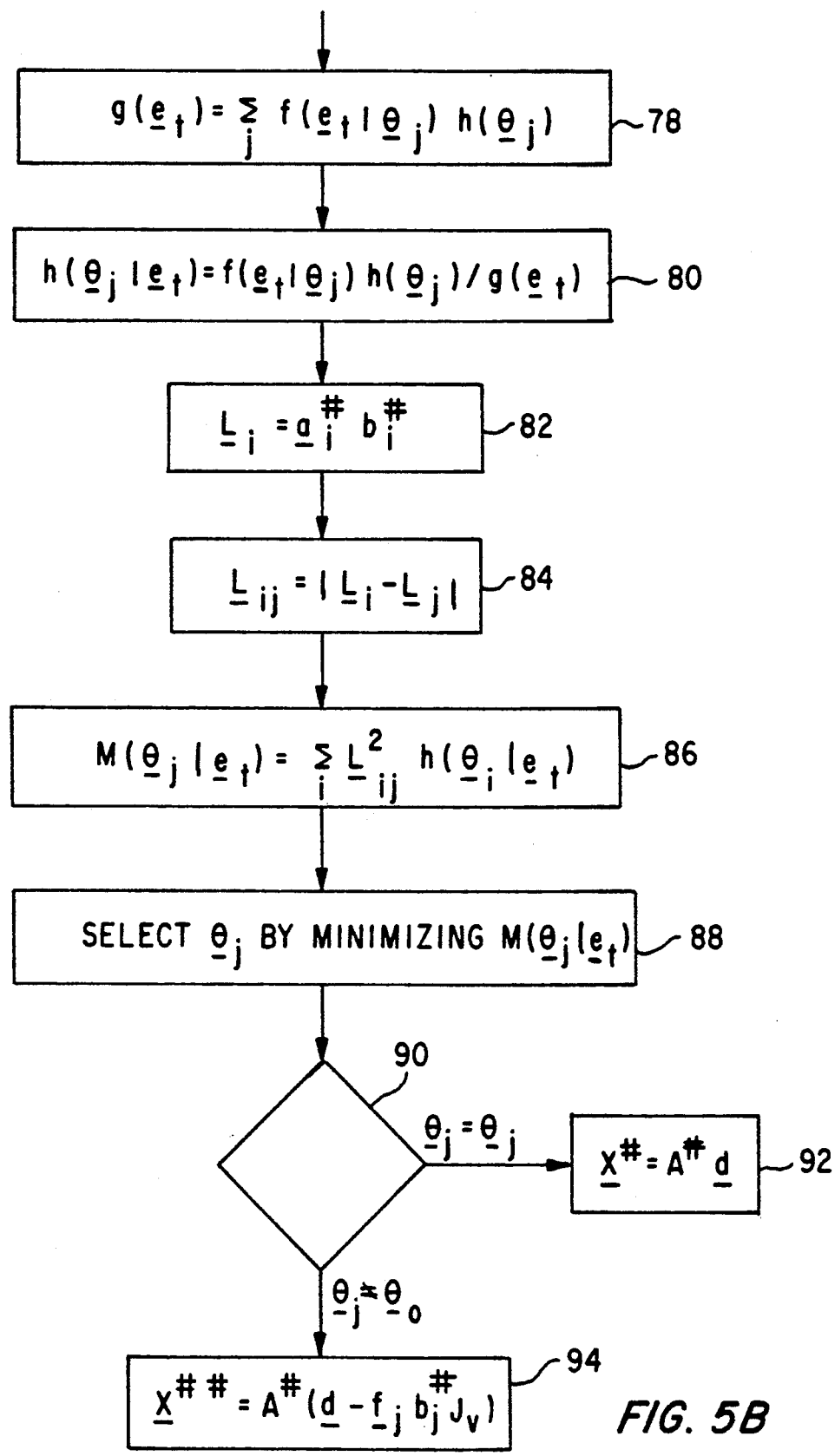

FIG. 5 illustrates the overall procedure for selecting the hypotheses that minimizes the margin of risk and provides a least squares solution for the aircraft's position. Computation 60 is used to create square matrix D. Matrix A is formed using pseudorange measurements as illustrated in equations 0.1 through 0.4. (In an active ranging system actual range measurements are used.) Computation 62 produces pseudo inverse matrix $A\#$. Projection matrix P is provided by computation 64. Computation 66 forms matrix Q by subtracting projection matrix P from identity matrix I. Computation 68 is used to provide the least square residual errors, where d is the difference between the estimated and observed ranges and where $\sigma_v$ is a normalizing noise factor that characterizes the noise environment. Computation 70 provides an estimate of the bias associated with each transmitter or satellite. The vector $b\#$ is formed by multiplying the diagonal matrix whose diagonal elements are the inverses of the diagonal elements of Q times the residual vector $e_t$. Computation 72 is used to produce the sum of the squares of the least square residuals. Computation 74 is used to form an estimated sum of the squares of the least square residuals without a particular satellite or transmitter included in the computation. This corresponds to the sum of the squares of the residuals of a reduced system where the $j^{th}$ satellite or transmitter is omitted. $Q_{jj}$ is the $j^{th}$ diagonal element of Q and $b_j\#$ is the $j^{th}$ component of $b\#$ computed in 70. Computation 76 is used to provide the conditional probability of having residual $e_t$ if hypothesis $\theta_j$ is true. Hypothesis $\theta_j$ corresponds to satellite or transmitter j being faulty. Computation 78 provides marginal distribution $g(e_t)$. The marginal distribution from computation 78 is formed by summing the products formed by multiplying the conditional probabilities by the corresponding a priori probabilities of satellite or transmitter j being in error. The a priori probabilities are obtained empirically or by using an assumed equipment failure rate. Computation 80 uses Baye's Rule to provide the conditional probability of transmitter j being in error for a particular residual $e_t$. It is possible to identify the faulty transmitter by picking the transmitter with the greatest conditional probability of being in error, however it is preferable to include a loss factor before attempting to identify the faulty transmitter. Computation 82 associates a loss vector with a particular satellite. It should be noted that $a_i\#$ is the $i^{th}$ column of $A\#$ and $b_i\#$ is the $i^{th}$ element of $b\#$. $A\#$ and $b\#$ are available from computations 62 and 70, respectively. Computation 84 provides $L_{ij}$ which associates a loss with the incorrect hypothesis that transmitter or satellite j is faulty when in reality transmitter or satellite i is faulty. Computation 86 is used to provide the expected system loss for the hypothesis that satellite j is in error by taking a weighted sum of the losses provided by computation 84. The sum is weighted by multiplying each loss by the conditional probability that transmitter or satellite i is in error for a particular residual $e_t$. Computation 88 minimizes system loss by indicating which hypothesis minimizes the overall loss. Decision 90 is used to decide whether the information provided by one of the satellites or transmitters should be removed from the aircraft position calculation. If the hypothesis $\theta_O$ is chosen, the aircraft position is chosen using the least square solution using all of the monitored satellites or transmitters. This computation is carried out in computation 92. If the decision indicates that a satellite or transmitter should be eliminated because of an error or bias contained in its data, computation 94 is carried out. Computation 94 provides an "early detection" least square solution to the aircraft's position and an estimate of the position that would be retrieved without using the data provided by a satellite or transmitter with erroneous or biased data. It should be noted that $f_j$ is the $j^{th}$ member of the standard basis for $R^m$. It is also possible to eliminate the erroneous data by just removing the faulty satellite or transmitter from the receiver's schedule.

Computation 60 through 72 are carried out in PVT computer 36, and computations 74 through 94 are carried out in computer or Bayesian classifier 40. The computations can be carried out using any convenient combination of hardware and/or software. All the calculations can be carried out in Bayesian classifier 40, or they can be carried out in any convenient computer. It is also possible to use specialized hardware to assist in performing or to perform these computations.

There is a highly coupled computation going on between PVT computer 36 and Bayesian classifier 40. One computer or processor can be used in place of PVT computer 36 and Bayesian classifier 40, or multiple computers or processors can be used if a high throughput is desired.

We claim:

1. A navigation system that receives signals from a plurality of transmitters and identifies an error producing transmitter, comprising:
    means for transmitting a signal that causes at least one of the plurality of transmitters to transmit a signal;
    means for receiving the transmitted signal;
    means for determining ranges from the transmitters;
    means for determining a least square residual error using said ranges;
    means using said least square residual error and Bayes Rule for determining a conditional probability that one of the plurality of transmitters is an error producing transmitter, including means for determining an estimate of a sum of the squares of the least square residual error for a reduced system which does not use said transmitter, and means for determining a conditional probability of said least square residual error using said sum of the squares of the least square residual error for said reduced system; and
    means for selecting a maximum conditional probability to identify the error producing transmitter.

2. A navigation system that receives signals from a plurality of transmitters and identifies an error producing transmitter, comprising:
    means for transmitting a signal that causes at least one of the plurality of transmitters to transmit a signal;
    means for receiving the transmitted signals;
    means for determining ranges for the transmitters;
    means for determining a least square residual error using said ranges;
    means using said least square residual error and Bayes Rule for determining a conditional probability that a transmitter is an error producing transmitter, including means for determining an estimate of a sum of the squares of the least square residual error for a reduced system which does not use said transmitter, and means for determining a conditional probability of said least square residual error using said sum of the squares of the least square residual error for said reduced system;
    means for estimating a first loss associated with each of the transmitters using said ranges;
    means for estimating a second loss associated with a hypothesis that said transmitter is the error producing transmitter using said conditional probability and said first loss estimate, including means for estimating a third loss which is associated with an incorrect hypothesis by taking a difference between a first loss associated with said error producing transmitter and a first loss associated with a second transmitter, and means for providing a sum of a plurality of third losses which are associated with a plurality of incorrect hypothesis, and means for multiplying said third loss by a conditional probability that said second transmitter is the error producing transmitter; and
    means for selecting a minimal second loss to identify the error producing transmitter.

3. A GPS navigation system that receives signals from a plurality of satellites and identifies an error producing satellite, comprising:
    means for transmitting a signal that causes at least one of the plurality of satellites to transmit a signal;
    means for receiving the transmitted signals;
    means for determining ranges from the satellites;
    means for determining a least square residual error using said ranges;
    means using said least square residual error and Bayes Rule for determining a conditional probability that a satellite in an error producing satellite, including means for determining an estimate of a sum of the squares of the least square residual error for a reduced system which does not use said satellite, and means for determining a conditional probability of said least square residual error using said sum of the squares of the least square residual error for each reduced system; and
    means for selecting a maximum conditional probability to identify the error producing satellite.

4. A GPS navigation system that receives signals from a plurality of satellites and identifies an error producing satellite, comprising:
    means for transmitting a signal that causes at least one of the plurality of satellites to transmit a signal;
    means for receiving the transmitted signals;
    means for determining ranges from the satellites;
    means for determining a least square residual error using said ranges;
    means for determining a conditional probability that a satellite is an error producing satellite using said least square residual error and Bayes Rule, including means for determining an estimate of a sum of the squares of the least square residual error for a reduced system which does not use said satellite, and means for determining a conditional probability of said least square residual error using said sum of the squares of the least square residual error for said reduced system;
    means for estimating a second loss associated with a hypothesis that said satellite is the error producing satellite using said conditional probability and said first loss estimate, including means for estimating a third loss which is associated with an incorrect hypothesis by taking a difference between a first loss associated with said satellite and a first loss associated with a second satellite, means for forming a sum of a plurality of third losses which are associated with a plurality of incorrect hypotheses, and means for multiplying said third loss which is associated with an incorrect hypothesis by a conditional probability that said second satellite is the error producing satellite; and
    means for selecting a minimal second loss to identify the error producing satellite.

* * * * *